W. H. TUCKER.
Top-Plate for Casters.

No. 217,172.                    Patented July 1, 1879.

WITNESSES.                              INVENTOR.
James B. Lizius                         William H. Tucker,
R. P. Daggett                           PER
                                        C. Bradford
                                                ATTORNEY.

UNITED STATES PATENT OFFICE.

WILLIAM H. TUCKER, OF INDIANAPOLIS, INDIANA.

IMPROVEMENT IN TOP PLATES FOR CASTERS.

Specification forming part of Letters Patent No. 217,172, dated July 1, 1879; application filed December 5, 1878.

*To all whom it may concern:*

Be it known that I, WILLIAM H. TUCKER, of the city of Indianapolis, county of Marion, and State of Indiana, have invented certain new and useful Improvements in Top Plates for Casters, of which the following is a specification, reference being had to the accompanying drawings, which are made part hereof, and on which similar letters of reference indicate similar parts.

The primary object of my invention is to render casters which have a top plate more applicable to use upon trucks, reference being more especially had to that class of such articles known as "adjustable stove-trucks," of which class that shown in my Patent No. 208,650, bearing date October 1, A. D. 1878, is a good example.

Figure 1:
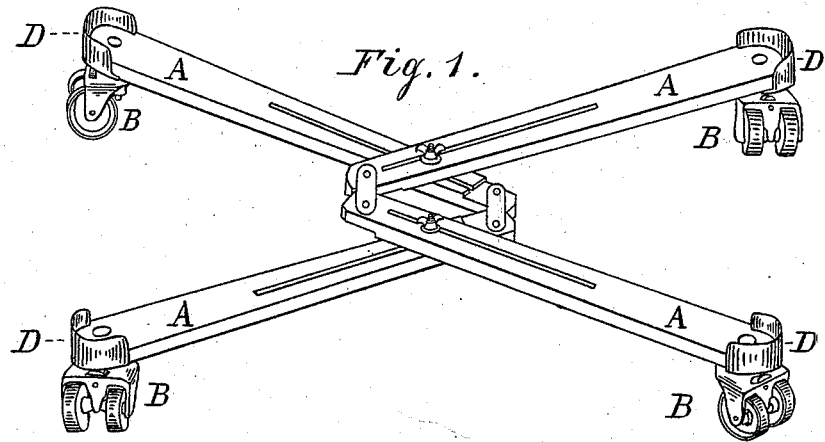
Figure 2:
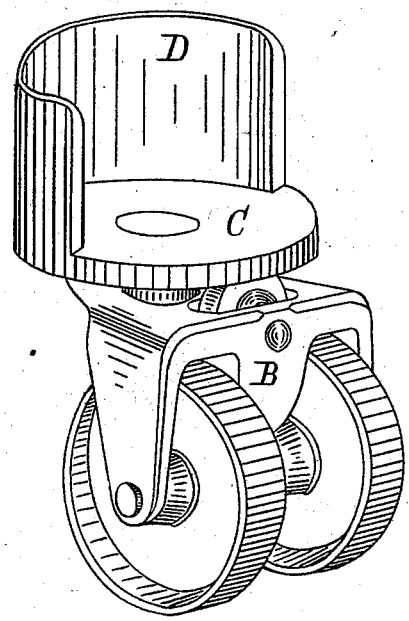
Figure 3:
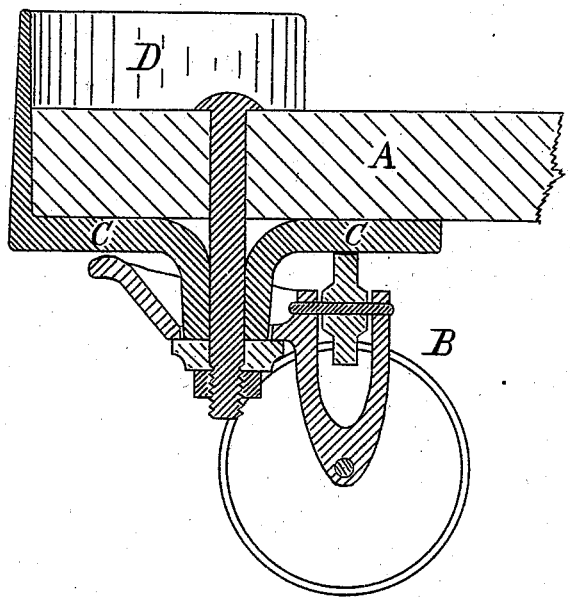

Figure 1 is a perspective view of such a truck upon which my present invention is employed. Fig. 2 is a perspective view of Martin's patent caster provided with my improved top plate, and Fig. 3 is a sectional view of the end of one of the beams of the truck when mounted upon such a caster and provided with my improvement.

In said drawings, the portions marked A represent the beams of the truck, those marked B the casters, and those marked C the top-plate thereto.

My improvement consists in providing the top plate C with an upwardly-projecting flange, D, which incloses the end of the truck-beam A, and prevents the latter from splitting, and which also projects far enough above the top of said beam to form an inclosure, within which the stove-foot shall rest and be prevented from slipping off the truck when the stove is mounted thereon.

The form of said flange which I prefer is an arc of a circle a little greater than its semi-circumference, as this form holds the ends of the beams most securely, and is the best shape for the above-mentioned inclosure; but so long as it holds the beam firmly and secures the stove-foot against slipping its form is immaterial.

Having thus fully described my said invention, what I claim as new, and desire to secure by Letters Patent, is—

The combination, with the beam of a stove-truck, of a caster having an upwardly-projecting flange upon its top plate to inclose the end of said beam, and to form an inclosure for the foot of the stove to be mounted thereon, substantially as specified.

In witness whereof I have hereunto set my hand and seal at Indianapolis, Indiana, this 2d day of December, A. D. 1878.

WILLIAM H. TUCKER. [L. S.]

In presence of—
   C. BRADFORD,
   WM. J. MILLNER.